US006850466B2

(12) United States Patent
Ozawa et al.

(10) Patent No.: US 6,850,466 B2
(45) Date of Patent: Feb. 1, 2005

(54) TIME RECORDER

(75) Inventors: Kenji Ozawa, Narashino (JP); Yuuki Yasui, Narashino (JP)

(73) Assignee: Seiko Precision Inc., Chiba-ken (JP)

( * ) Notice: Subject to any disclaimer, the term of this patent is extended or adjusted under 35 U.S.C. 154(b) by 0 days.

(21) Appl. No.: 10/658,872

(22) Filed: Aug. 28, 2003

(65) Prior Publication Data

US 2004/0047240 A1 Mar. 11, 2004

(30) Foreign Application Priority Data

Aug. 30, 2002 (JP) ....................................... 2002-253399
Aug. 5, 2003 (JP) ....................................... 2003-286891

(51) Int. Cl.[7] ........................ G04B 47/00; G01D 15/04; G01D 15/20

(52) U.S. Cl. ............................. 368/10; 346/28; 346/80; 346/82

(58) Field of Search ....................... 368/10, 41; 346/20, 346/80–82, 86–88; 235/377

(56) References Cited

U.S. PATENT DOCUMENTS

| | | | | |
|---|---|---|---|---|
| 4,466,078 A | * | 8/1984 | Treiman | 710/73 |
| 4,494,127 A | * | 1/1985 | King | 346/82 |
| 4,899,173 A | * | 2/1990 | Elliano | 346/82 |
| 5,767,869 A | * | 6/1998 | Saito | 725/5 |

* cited by examiner

*Primary Examiner*—Vit W. Miska
(74) *Attorney, Agent, or Firm*—Jordan and Hamburg LLP

(57) ABSTRACT

A time recorder can print characters without reducing the print font size or increasing the width of a time card itself. Also, no limitations are imposed on the number of clock ins/outs per day. A control unit checks the identity of card identification information attached to the time card. The control unit instructs a printing unit to print clock in/out information in succession such that the printed line is changed for each one set of clock in/out, and records the information in a recording unit. When all the print lines are used up, clock in/out information recorded in the recording unit is taken over as card identification information on a new time card.

7 Claims, 6 Drawing Sheets

TIME RECORDER

BACKGROUND OF THE INVENTION

1. Field of the Invention

The present invention relates to a time recorder to punch in and out for managing employees or the like.

2. Description of the Related Art

In the past, as a time recorder operating to punch in and out for managing employees or the like dedicated time cards have been used, based on a pay period such as a monthly, weekly, or biweekly period matched to the company's employment regulations and procedures. Printing has been done on one time card per pay period. The printing system is described in further detail by taking a time card for a monthly pay period as an example. Fifteen print lines are formed on the front side and 16 print lines on the rear side. In total, 31 print lines are formed. Daily clock in/out times are printed such that one line is assigned to one day. Where there are no ins/outs on a holiday or vacation, the blank columns are left.

Therefore, where an employee repeats in and out his office several times during a period from the beginning of the work to the end of the work, one proposed time recorder of related art as described in Reference 1 (JP-A-2002-118102) modifies the status of printing easily and prints daily clock in/out times. Another proposed time recorder of related art as described in Reference 2 (JP-A-2002-342801) recalculates the sum of actual working hours and timees the modified actual working hours. This recorder also erases the actual working hours so far.

However, in the method of printing clock in/out times in one day on one line as in Reference 1, because of a limitation on the printable width of each time card, the number of clock ins/outs printable on one line is limited to 2 to 6 at most. Furthermore, where the actual working hours between clock ins and clock outs are totalized again and printed as in Reference 2, the number of clock ins/outs printable on one line is also limited and so the printing is not easy to read. Accordingly, in order to increase the number of clock ins/outs that can be printed on one line, it is necessary that the print font size be reduced or the width of the time card itself be increased.

If the print font size is reduced, however, it becomes more difficult to read the printing visually. Also, misreading occurs more frequently. If the width of the time card itself is increased, the size of the time recorder that prints on the time card is increased, thus presenting problems. That is, the manufacturing cost is increased. A broader installation space is also necessary. Furthermore, lines for holidays are left as empty lines in principle, resulting in wastage. Where the starting times of pay periods are different frequently, it is necessary to prepare different time cards for the different cases.

SUMMARY OF THE INVENTION

Accordingly, it is an object of the present invention to provide a time recorder that can print on a time card without using a smaller print font or increasing the width of the time card itself in such a way that no limitations are imposed on the number of clock ins/outs per day.

A first feature of a time recorder according to the present invention for solving the aforementioned problem is that the recorder is so constructed that each set of clock in/out information is printed on a different print line while maintaining the identity of card identification information attached to a time card. After printing is done on the final line of the time card, the clock in/out information on the time card can be taken over to a new one.

In particular, the time recorder is used for printing on a time card having card identification information, and has a card identification unit for identifying the card identification information, a printing unit for printing clock in/out information on the time card, a recording unit for recording the card identification information and the clock in/out information, and a control unit. Where the time card is inserted, the control unit makes inquiries of the card identification information transmitted from the card identification unit and of the card identification information recorded in the recording unit. Where the inquired card identification information is recorded in the recording unit, the control unit detects immediately previously recorded clock in/out information relative to the card identification information.

Where the immediately previously recorded clock in/out information is clock-in information, the control unit instructs the printing unit to print clock-out information on the same line as the clock-in information in the time card. On the other hand, where the immediately previously recorded clock in/out information is clock-out information, the control unit instructs the printing unit to print clock-in information on the line of the time card that is next to the line on which the clock-out information has been printed. Where the clock-out information is printed on the final print line of the time card, the control unit shifts to a takeover mode. Where the time card is ejected and then an unused time card is inserted, the clock in/out information that is on the ejected time card and recorded in the recording unit is updated as clock in/out information relative to card identification information on the unused time card.

By constructing the invention in this manner, if a person goes in and out several times within a day, the information such as the clock in/out times can be printed. Furthermore, the clock in/out information is updated for the new time card. Therefore, working hours, early leave, overtime hours, and so on during each given period can be totalized, calculated, and printed. Printing and totalization of clock in/out information about the same person are carried out for each card identification information attached to each time card. Consequently, it is not necessary to enter identification information about each individual person. Accordingly, the cost of creating time cards can be reduced. The procedure for processing information in the control unit can be made simpler. An unused time card may involve the case where the rear surface of a time card is used.

A second feature of the time recorder according to the invention is that the control unit described in the above-described first feature updates clock in/out information that is on the ejected time card and recorded in the recording unit as clock in/out information relative to the card identification information on an unused time card only where the unused time card is inserted within a given time after shifting to the takeover mode.

That is, in the time recorder described in the first feature, after shifting to the takeover mode, it cannot be denied that there is a possibility that another person inserts an unused time card by chance and the clock in/out information is taken over to the person. Especially, where the time interval from the shifting to the takeover mode to the time when an unused time card is inserted increases, the possibility increases. Therefore, the recorder is so constructed that only where an unused time card is inserted within a short time after shifting to the takeover mode, the operation is regarded to have been done by the same person, and the takeover processing is performed. Where no unused time card is inserted within the given time, the takeover mode may be canceled, and the time card that is not yet taken over may be inserted again as described later. Alternatively, the card identification information not yet taken over may be entered manually or other means may be taken. In this way, it is possible to shift to the takeover mode again.

A third feature of the time recorder according to the invention is that the time recorder described in the first feature has a manual card identification information input unit. That is, where card identification information on a time card is entered by the input unit after clock-out information is printed on the final print line of the time card and the time card is ejected, the control unit extracts clock in/out information recorded relative to the card identification information from the recording unit. Where an unused time card is inserted, the control unit updates the extracted clock in/out information as clock in/out information relative to the card identification information on this unused time card.

That is, in order to update the recording of clock in/out information, it is necessary that clock in/out information recorded relative to unupdated card identification information be identified and that the clock in/out information be rerecorded as clock in/out information relative to card identification information on the unused time card. In the time recorders described in the first and second features, where printing is done on the final print line of the time card, shifting to the takeover mode is automatically done. Thus, clock in/out information recorded relative to the card identification information on the time card is identified as information to be taken over.

In the present invention, however, where printing is done on the final print line of the time card, unupdated card identification information is entered by a separate, manual card identification information input unit without shifting to the takeover mode. The recorded, unupdated clock in/out information is identified. The clock in/out information is rerecorded as clock in/out information relative to the card identification information on the unused time card. Accordingly, if any unused time card is not at hand after printing is done on the final line of the present card and it is ejected, for example, and if the takeover processing cannot be immediately performed but rather a long time passes, the takeover processing can be reliably performed by the same person even where another person inserts an unused time card during the intervening period.

A fourth feature of the time recorder according to the invention is that the time recorder described in the first feature is fitted with a manual takeover mode switching unit. That is, where (i) clock-out information is printed on the final print line of the time card, (ii) the time card is ejected, then (iii) a takeover operation is started by the takeover mode switching unit, and (iv) the ejected time card is inserted, the control unit extracts the clock in/out information recorded relative to the card identification information on the time card from the recording unit. Where an unused time card is inserted, the control unit updates the extracted clock in/out information as clock in/out information relative to the card identification information on the unused time card.

In particular, in the present invention, when a takeover operation is performed by the takeover mode switching unit, shifting to the takeover mode is done. The time card not yet taken over is inserted again. Thus, clock in/out information that is not yet taken over and recorded relative to the card identification information is identified. The identified clock in/out information is rerecorded as clock in/out information corresponding to the card identification information on a newly inserted unused time card. Accordingly, if a long time passes before the takeover processing, the takeover processing can be reliably performed for the same person, in the same manner as in the aforementioned cases.

A fifth feature of the time recorder according to the invention is that the time recorder described in any one of the first through fourth features is fitted with a warning unit. Where clock-out information is printed on the final print line of a time card, the control unit instructs the warning unit to operate.

Accordingly, where clock-out information is printed on the final print line of the time card, the user of the time card can be reliably informed that the aforementioned takeover processing is necessary.

A sixth feature of the time recorder according to the invention is that the time recorder described in any one of the first through fourth features is fitted with a warning unit. Where a time card having card identification information already recorded in the recording unit is inserted instead of the unused time card, the control unit instructs the warning unit to operate without updating the clock in/out information.

In particular, there is a possibility that a time card having card identification information already recorded in the recording unit is erroneously inserted instead of the unused time card. In this case, the clock in/out information cannot be taken over to a new, unused time card. Therefore, by constructing the invention in this manner, the clock in/out information can be prevented from being taken over to a used time card.

A seventh feature of the time recorder according to the invention is that the recorder automatically shifts to the takeover mode where a time card in which the clock-out information has been printed on the final print line is inserted and the card is registered with the recording unit. That is, where the time card is inserted, the control unit makes inquires of the card identification information transmitted from the card identification unit and of the card identification information recorded in the recording unit. Where the inquired card identification information has been recorded in the recording unit, the control unit detects clock in/out information immediately previously recorded relative to the card identification information. Where clock-out information is printed on the final print line of the time card, the recorder shifts to the takeover mode. Where an unused time card is inserted after the present time card is ejected, the control unit updates the clock in/out information, which is on the ejected time card and recorded in the recording unit, as clock in/out information relative to the card identification information on the unused time card.

Specifically, in the present invention, a time card on which the clock-out information has been printed on the final print line and which is not yet taken over is inserted again. Thus, it is checked whether the card identification information has been registered with the recording unit. Clock in/out information that is not yet taken over and has been recorded relative to the card identification information is identified. The identified clock in/out information is rerecorded as clock in/out information corresponding to the card identification information on a newly inserted, unused time card. Accordingly, no manual switching operation is needed. In the same manner as in the cases of the third and fourth features, if a long time passes before takeover processing, the takeover processing can be reliably performed for the same person.

The advantages of the invention are now described. First, each different set of clock in/out information is printed on a different print line in turn. Clock in/out information can be printed regardless of the number of clock ins/outs in a day without increasing the width of the time card. Secondly, clock in/out information is updated for a new time card and so working hours, early leave, overtime hours, and so on in each given period can be totalized, calculated, and printed. Thirdly, printing can be done without preparing lines for holidays. Therefore, time space is not wasted.

Fourthly, printing and totalization of clock in/out information about the same person are carried out for each card identification information attached to each time card. Therefore, it is not necessary to enter identification information for each person. Accordingly, the cost of creating time cards can be reduced. Also, the procedure for processing information in the control unit can be made simpler. Fifthly, takeover processing can be started manually and so this takeover processing can be reliably done by the same person if takeover processing cannot be done immediately and a long time has passed.

Sixthly, where clock-out information is printed on the final print line of a time card, the user of the time card can be reliably informed by the warning unit that the takeover processing is necessary. Seventhly, if an erroneous time card is inserted during the takeover operation, the warning unit can give a notice of the effect to the user of the time card. Eighthly, the takeover processing can be started simply by reinserting a used time card. Therefore, the same person can reliably perform the takeover processing without manual operations if the takeover processing cannot be performed immediately and a long time has passed.

DESCRIPTION OF THE PREFERRED EMBODIMENTS

A time recorder according to the present invention is used for a time card 1 having card identification information 1*a*. The recorder has card identification units 2*a*, 2*b* for identifying the card identification information, a printing unit 3 for printing clock in/out information on the time card, a recording unit 5 for recording the card identification information and the clock in/out information, and a control unit 4.

Figure 1:
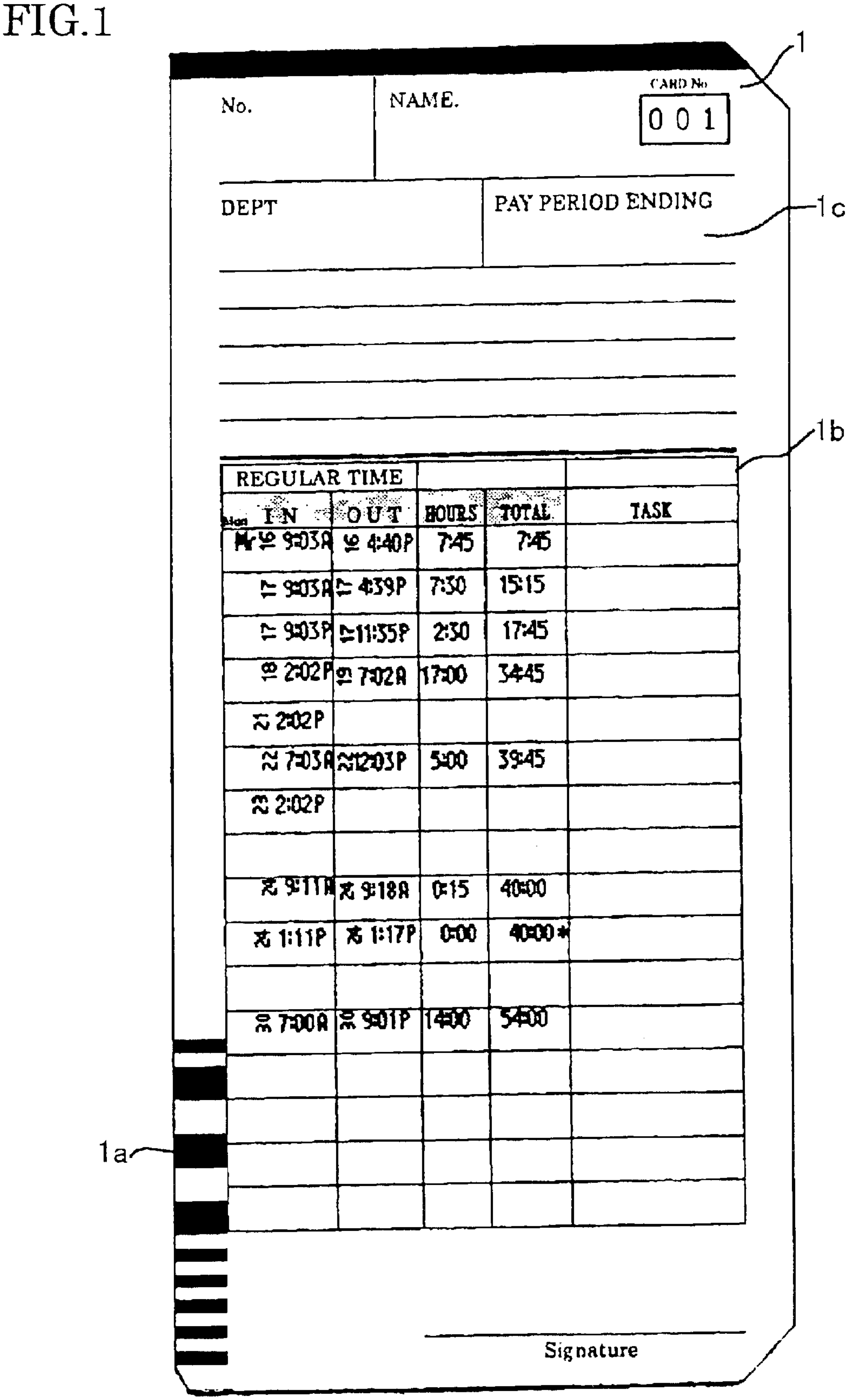
FIG. 1 shows an example of printing on a time card.

First, the time card 1 used for the time recorder according to the invention is described by referring to FIG. 1. The time card 1 consists of a vertically long cardboard. A barcode 1*a* that is card identification information is attached to a lower, left side portion of each such time card. Handwritten or typed columns 1*c* including name (NAME), belonging department (DEPT), and final day of the pay period (PAY PERIOD ENDING) are formed at higher positions. Columns 1*b* where clock in/out information such as clock in/out times is printed are put in the center.

In particular, formed at the left end is a time column where the name of a month indicating an attendance period is denoted by its initial alphabetical letter. Time columns where a date printed laterally and a clock-in time are printed also formed. Furthermore, another time column is formed to distinguish morning (A) and afternoon (P). Furthermore, there are successive time columns where clock-out (OUT) time, actual working hours, accumulated time, and remark (TASK) are respectively printed. The name of the month is printed only in a case where it is printed at the first stage of the time card 1 and in a case where the month changes during the use, to prevent complicated printing. Whenever a set of clock in and out is printed, the stage is shifted, and then the next printing is done.

Figure 2:
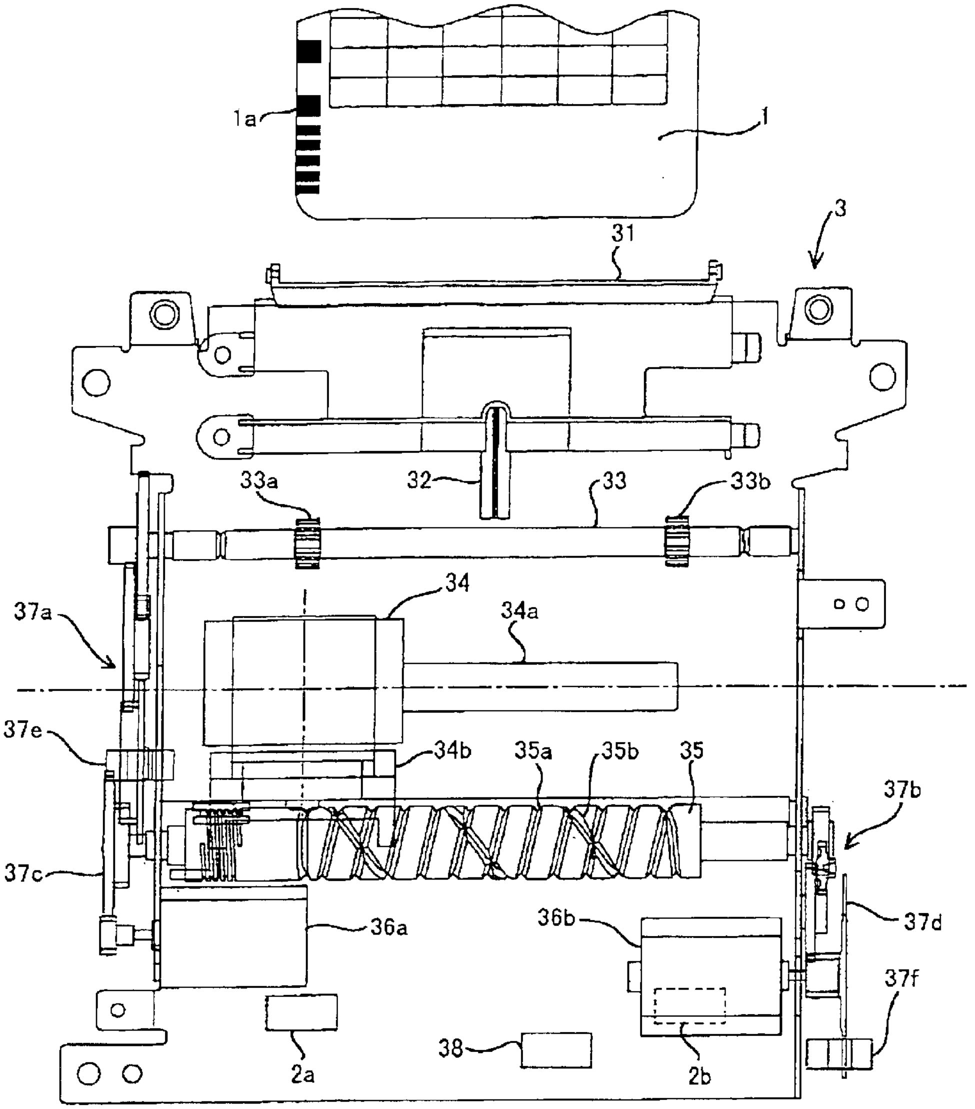
FIG. 2 is a schematic structural view of a printing unit.

The structure of the printing unit 3 is next described by referring to FIG. 2. The printing unit 3 is a so-called printer that prints clock in/out information on the time card 1 described above. The printer has a card port 31 in its upper end portion to insert the time card. The card port places the time card in position in the left and right direction. The printer has a card detection switch 32 under the card port 31. The switch 32 is activated when pushed up by the front end portion of the inserted time card 1. A roller shaft 33 is mounted under the card detection switch 32. A pair of pinch rollers 33*a*, 33*b* made of rubber is mounted on the roller shaft. The time card 1 is drawn in downward by rotation of the pinch rollers 33*a* and 33*b*. The printer has a print head 34 for printing on the time card 1, the head being located under the roller shaft 33. A platen 34*a* acting as a support stage for printing is mounted opposite to the print head.

The print head 34 is supported to a carrier 34*b*. This carrier is moved horizontally by a lead screw 35. Specifically, grooves 35*a* and 35*b* are helically formed in the outer surface of the lead screw 35. Pawls formed on the carrier 34*b* are in engagement with the grooves. Accordingly, as the lead screw 35 rotates, the carrier 34*b* moves horizontally. The groove 35*a* is used to move the carrier 34*b* in the rightward direction as viewed in the figure. This groove is connected with the groove 35*b* which is opposite in helical pitch direction to the groove 35*a* and has a wider pitch interval. The carrier is quickly returned to the left as viewed in the figure without rotating the lead screw 35 in reverse.

The roller shaft 33 and lead screw 35 are rotationally driven by a card feed motor 36*a* and a carrier driving motor 36*b*, respectively, via reduction gearings 37*a* and 37*b*, respectively. Each of the motors 36*a* and 36*b* can rotate in both forward and rearward directions. The reduction gearings 37*a* and 37*b* are fitted with rotating disks 37*c* and 37*d*, respectively. Each of these rotating disks is provided with a number of through-holes that are regularly spaced from each other on the same circumference. The numbers of passing through-holes during rotation are measured by optical sensors 37*e* and 37*f*. The rotational angle between the card feed motor 36*a* and the carrier driving motor 36*b* is detected.

A pair of left and right barcode reading sensors 2*a* and 2*b*, each consisting of a scanning sensor, are mounted as the card identification unit 2 at a lower position in the printing unit 3. The sensors read the barcode 1*a* printed on one side end portion at a lower position of the time card 1. The barcode reading sensor 2*b* mounted at the right side as viewed in the figure is intended to read the barcode 1*a* that has been turned inside out where the rear surface of the time card 1 is used.

This sensor 2*b* is installed in such a manner that it is turned inside out when viewed from the front relative to the barcode reading sensor 2*a* mounted at the left as viewed in the figure. A card sensor 38 is mounted at the lowest position of the printing unit 3. When the sensor 38 detects the front end of the time card 1, the sensor stops the card feed motor 36*a* and the operation for drawing in the time card. The printing unit 3 is provided with a time display unit (not shown) indicating the present time for the user. Although not shown, the printing unit 3 has a pushbutton switch, a switch that is a manually operated takeover mode switching unit, and a warning unit for giving a notice of an erroneous operation by a warning sound. The pushbutton switch is a manual input unit for entering card identification information 1*a* as described later. A touch panel acting as a display unit and as an input unit can also be used.

The operation of the printing unit 3 is next described. When the time card 1 is inserted from the card port 31, the front end of the time card turns on the card detection switch 32, thus rotating the card feed motor 36*a*. The roller shaft 33 is driven to draw in the time card. When the front end is detected by the card sensor 38 mounted at the bottom of the printing unit 3, the card feed motor 36*a* is brought to a stop. The time card stops at this position.

Meanwhile, when the time card 1 is being drawn in, the barcode 1*a* printed on the time card is read by the barcode reading sensor 2*a* and thus the time card is identified. Then, the card feed motor 36*a* rotates in reverse. The roller shaft 33 driven by it pulls up the time card 1. The time card is stopped at a position where the print head 34 can print on a given print line. The print position is controlled based on an instruction from the control unit 4.

In particular, where the time card 1 is not yet used, the card is pulled up such that printing can be done on the head print line. Meanwhile, where the time card 1 continues to be used, it is pulled up to a given intermediate printable stage. This pulled up position is determined based on the numbers of passes of the through-holes in the rotating disk 37*c*, the disk interlocking with the card feed motor 36*a*. The passes are measured by the optical sensor 37*e*.

Then, the carrier driving motor 36*b* rotates. The lead screw 35 driven by it moves the print head 34 horizontally such that characters are printed at a given horizontal position on the time card 1. The horizontal position is controlled based on an instruction from the control unit 4. That is, where clock-in times (such as attendance month, day of the week, and time), clock-out time, actual working hours, accumulated time, or the like is printed, the print head 34 is first moved into their respective print start positions. Whenever one character is printed, the print head is made to horizontally move a distance corresponding to the space of one character. Where data columns in which various kinds of print data are printed are formed on the time card 1, the print head 34 is moved into the head positions of these data columns. The horizontal position of the print head 34 is determined based on the numbers of passes of the through-holes in the rotating disk 37*d*, the disk interlocking with the carrier driving motor 36*b*. The passes are measured by the optical sensor 37*f*.

Where the printing ends or an erroneous time card 1 is inserted as described later, the card feed motor 36*a* is rotated based on an instruction from the control unit 4. The time card is pulled up until the card detection switch 32 reaches its off position. Thus, the printing operation ends.

Reading of the barcode 1*a* on the time card 1 may also be easily done by moving the barcode reading sensors 2*a* and 2*b* up and down after drawing in the time card and scanning the barcode. Furthermore, instead of the barcode 1*a*, print holes or magnetic stripes may be formed to facilitate identifying the time card 1.

The control unit 4 incorporates a microcomputer and gives the print unit 3 instructions on clock in/out information and print position based on the time when the time card 1 turns on the card detection switch 32. Furthermore, the control unit makes a recording in the recording unit 5 and extracts necessary information from the recording unit. The actual working hours and accumulated time are calculated from the clock in/out information and from the information recorded in the recording unit 5. In addition, the control unit records the card identification information 1*a* on the time card 1 read by the barcode reading sensor 2*a* in the recording unit 5, extracts the information, makes inquiries, or otherwise operates.

Information processing by the control unit 4 is next described in detail by referring to FIGS. 3–6. First, in FIG. 3, when the time card 1 is inserted into the printing unit 3 (step A), the card detection switch 32 operates (step B). The control unit 4 instructs the printing unit to draw in the time card (step C). When the time card 1 has been drawn in, the card identification information 1*a* owing to the barcode attached to the time card is read by the card identification unit 2 (step D). The control unit 4 checks whether the card identification information has been already recorded in the recording unit 5 (step E).

Where the card identification information 1*a* is not recorded, the control unit 4 judges that the information is the first clock-in information in the first day of the pay period and gives an instruction to the printing unit 2 to print the clock-in information (Cin) in the clock-in information print column on the head print line of the time card 1 and to eject the card after the printing. The printing unit executes this instruction (step F). The control unit 4 records the card identification information and the printed line in the recording unit 5 in an unillustrated manner. Meanwhile, where the card identification information 1*a* has been recorded, the control unit 4 inquires of the recording unit 5 the immediately preceding input information relative to the card identification information (step G). Where the immediately preceding input information is clock-out information (Cout), the control unit 4 checks whether a printable line is still left on the time card 1 (i.e., whether the final print line has been already printed) from the printed print lines recorded in the recording unit 5 (step H).

Where there remains no printable line, the control unit 4 ejects the card as a used time card 1 and provides information to this effect. The control unit also gives an instruction to issue a warning sound to shift to the takeover mode. The printing unit 3 and warning unit execute these instructions (step I). Processing in the takeover mode will be described later. On the other hand, where there remains a printable line, the control unit 4 gives an instruction to print the clock-in information (Cin) on the next print line of the time card 1 and to eject the card. The printing unit 3 executes the instruction (step J). On the other hand, where the immediately preceding input information is clock-in information (Cin) (step G), the control unit 4 checks whether the remaining print line on the time card 1 is the final print line, from the already printed lines recorded in the recording unit 5 (step K).

Where the print line remaining on the time card 1 is not the final print line, the control unit 4 gives an instruction to print clock-out information (Cout) on the same line as the immediately preceding clock-in information (Cin) and to eject the card. The printing unit 3 executes this instruction (step L). The control unit 4 gives an instruction (unillustrated) to calculate from the immediately preceding clock-in information and clock-out information (Cin/out) the actual working hour between them, print it on the actual working hour time column on the same line, add the hour to the accumulated time, and record this in the recording unit 5. On the other hand, where the print line remaining on the time card 1 is the final print line (i.e., after clock-out information has been printed on the line), printing can no longer be done on the time card the next and subsequent times. In this case, the control unit 4 shifts to the takeover processing illustrated in FIGS. 4–6. Accordingly, daily clock in/out information and the actual working hour between them are printed on each successive line for each set of clock in/out information until the printable lines remaining on the time card 1 decrease to one line.

Figure 3:
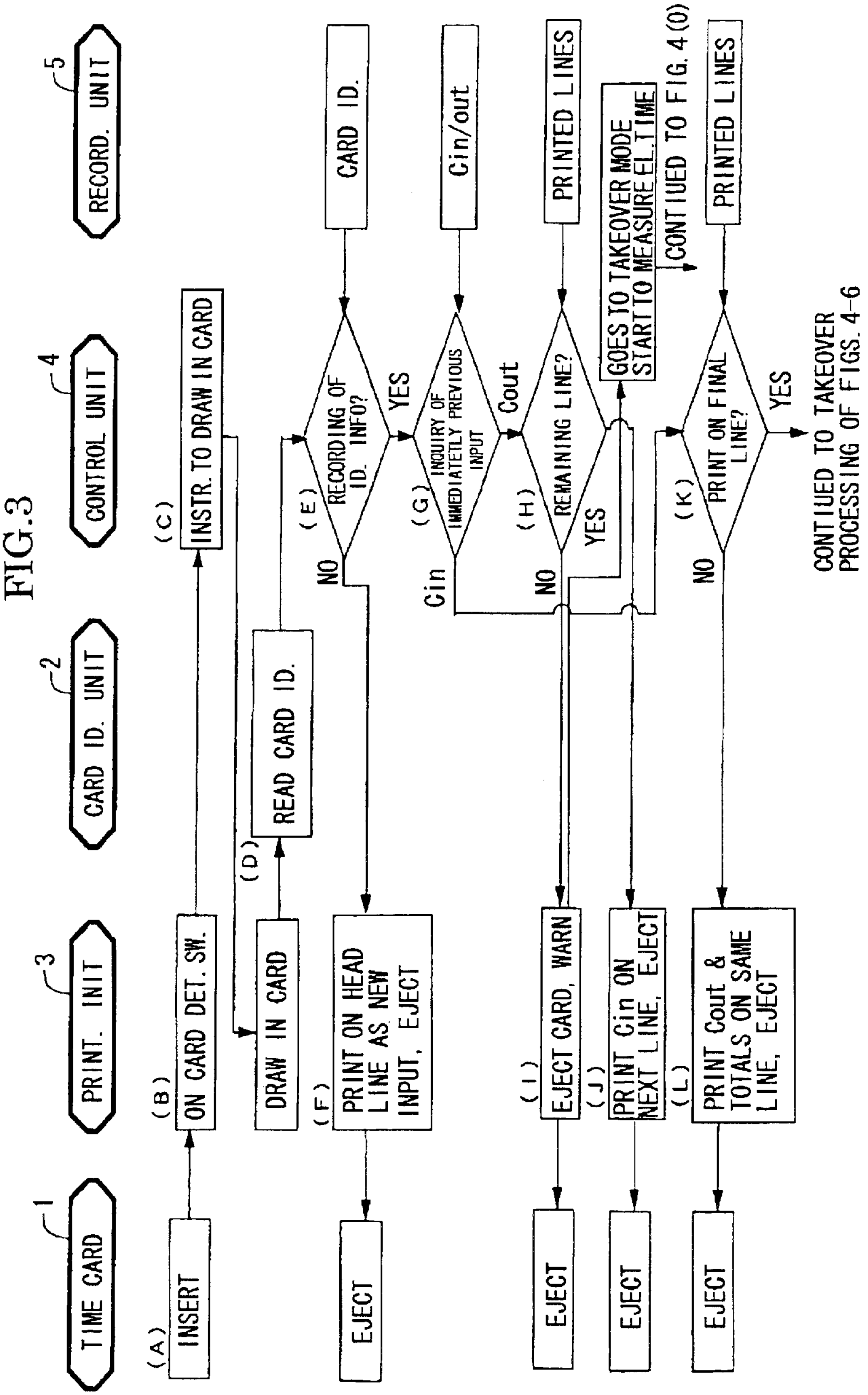
FIG. 3 is a flowchart illustrating the flow of information processing in a time recorder.
Figure 4:
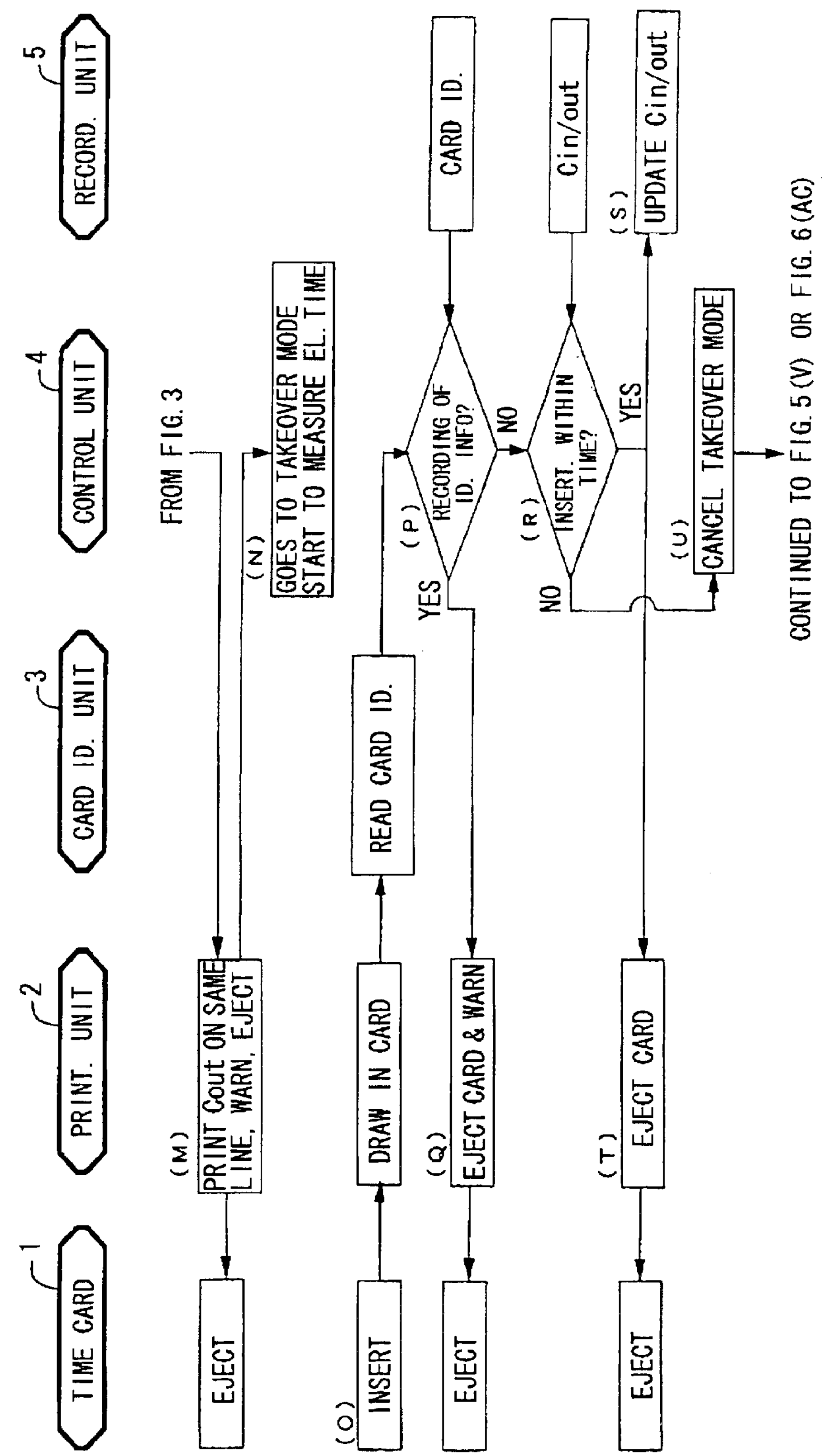
FIG. 4 is a flowchart illustrating the flow of information processing in takeover processing.

FIG. 4 illustrates cases where shifting to the takeover mode is automatically done. These include two cases. In one, clock-out information has been printed on the final print line as illustrated in step K of FIG. 3. In the other, the used time card 1 on which printing has been done up to the final print line is inserted as illustrated in the above step H of FIG. 3. That is, in the former case, the control unit 4 gives instructions to print the clock-out (OUT) information on the same print line as the immediately preceding printed line, to eject the time card 1, and to issue a warning sound to the effect that shifting to the takeover mode will be done. The printing unit 3 and warning unit execute these instructions (step M). The control unit 4 shifts to the takeover mode together with the warning sound, and starts to measure the time elapsing after the warning sound (step N). In the latter case, the control unit 4 gives an instruction to issue a warning sound that provides the information that the mode is shifted to the takeover mode by insertion of the used time card 1. The printing unit 3 and warning unit execute the instruction (step I). The control unit 4 shifts to the takeover mode together with the warning sound, and starts to measure the time elapsing after the warning sound (step I1). Shifting to the takeover mode means that where an unused time card 1 is next inserted, a new pay period does not start but the clock in/out information (Cin/out) is so treated that it is continuously printed, recorded, and processed within the same pay period as illustrated in the aforementioned steps E and F of FIG. 3.

After the user has been notified by the warning sound that the takeover processing is necessary, he or she inserts a new time card 1 (step O). Then, the control unit 4 checks whether the card identification information 1*a* on the new time card has been already recorded in the recording unit by a procedure similar to the above-described steps B–E of FIG. 3 (step P). Where the card identification information 1*a* on the new time card 1 has been already recorded, the card is a used one or a card currently used by another person. Therefore, the control unit 4 gives instructions to eject the time card and to issue a warning sound providing the information that there is an erroneous operation. The printing unit and warning unit execute the instructions (step Q).

Meanwhile, where the card identification information 1*a* on the new time card 1 is not recorded, i.e., it is not yet used or the rear surface is newly used, the control unit 4 checks whether the aforementioned elapsed time is within a given time (e.g., within 10 seconds) (step R). Where insertion of the new time card 1 is within the given time, the control unit 4 gives instructions to update clock in/out information (Cin/out) corresponding to the card identification information 1*a*, which is not yet taken over and has been recorded in the recording unit 5, as clock in/out information (Cin/out) corresponding to the card identification information 1*a* on the new time card (step S) and to eject the new time card. The printing unit 3 executes the instructions (step T). Where shifting to the takeover mode is done by insertion of the used time card 1, the control unit gives an instruction to the printing unit 3 to print clock-in information (Cin) on the head print line of the new time card and to eject the card then. The printing unit 3 executes the instructions (unillustrated).

Where insertion (step O) of a new time card 1 is done after a lapse of a certain time, the control unit 4 cancels the takeover mode (step U). That is, if the takeover mode is continued over a long time, the possibility that another person inserts a new time card 1 by chance during the period cannot be eliminated. For example, this is a case where the concerned person once moves away from the location where the time recorder is installed. On the other hand, if the duration of the takeover mode is set short, it is unlikely that a person different from the person inserts a new time card 1. Accordingly, to prevent such an erroneous operation, the takeover mode is canceled provided that the short duration of the takeover mode has passed.

Therefore, in a case where a new time card 1 has been inserted (step O) after cancellation of the takeover mode, the processing is performed on the assumption that another person has entered the first day of a new pay period as in step F of FIG. 3. On the other hand, where the same person performs the takeover processing again, processing that follows step V of FIG. 5 or step AC of FIG. 6 (described later) will be performed. It is also possible to shift to the takeover mode by the insertion of the used time card as mentioned previously.

Figure 5:
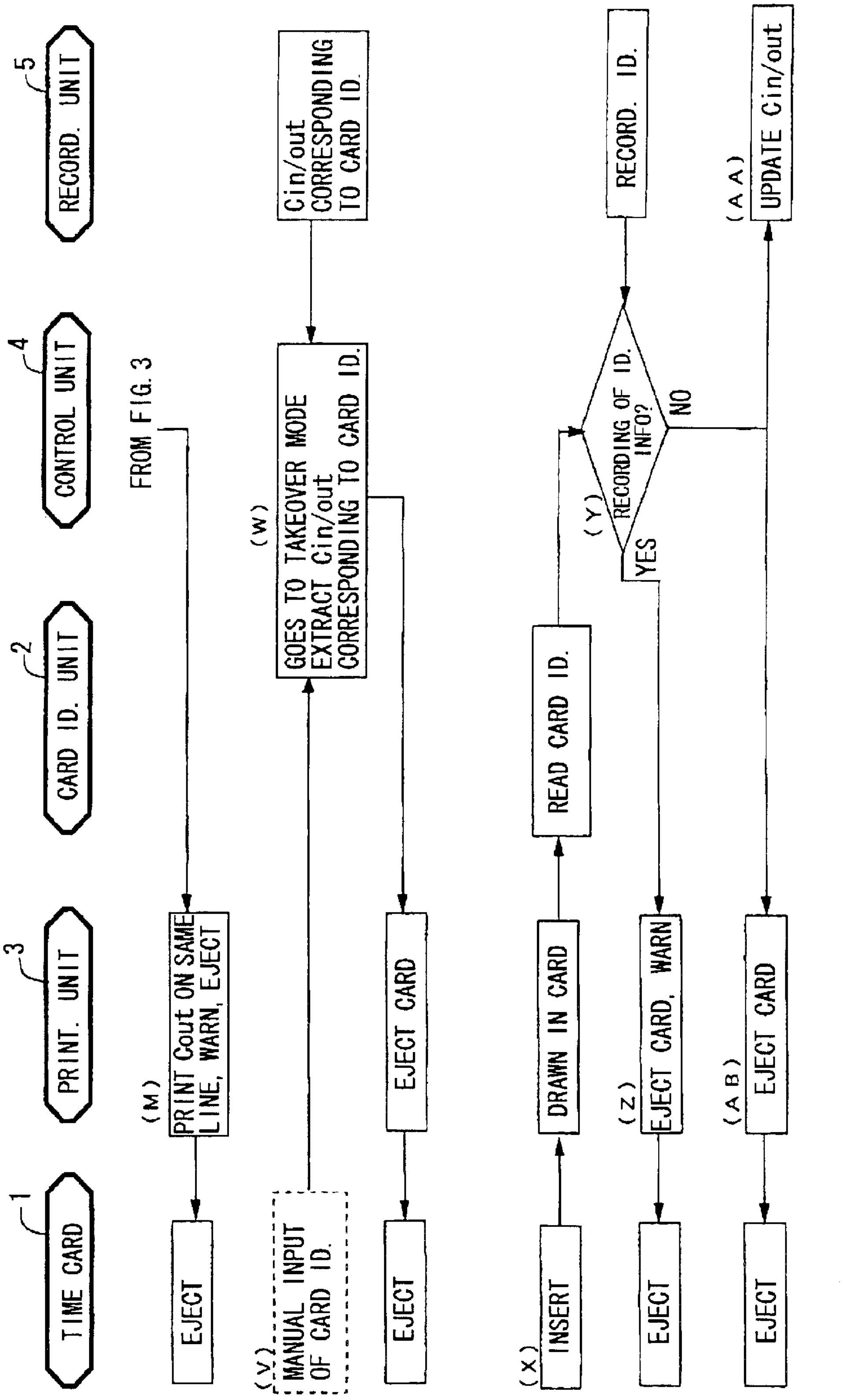
FIG. 5 is another flowchart illustrating the flow of information processing in the takeover processing.

FIG. 5 illustrates a case where the takeover processing is performed by manually entering the card identification information 1*a* on the time card 1 which is not yet taken over and on which the final print line has finished to be printed. For example, a numeral of the card identification information 1*a* is entered by depressing a numeral on push button switches mounted on the time recorder (step V). When the card identification information 1*a* is entered in this maner, the control unit 4 shifts to the takeover mode, and extracts the clock in/out information (Cin/out), which corresponds to the card identification information and is not yet taken over, from the recording unit 5. If the time card 1 has been inserted in the time recorder, an instruction is given to eject the time card 1 that is not yet taken over (step W).

Where a new time card 1 is then inserted (step X), the control unit 4 checks whether the card identification information 1*a* has been already recorded in the recording unit 5 in the same manner as the foregoing (step Y). Where it has been recorded, i.e., the time card is a used one or currently used by another person, the control unit 4 regards the operation as an erroneous operation and gives instructions to eject the time card and to issue a warning sound providing information to that effect. The printing unit 3 and warning unit execute the instructions (step Z).

Meanwhile, where the card identification information 1*a* on the new time card 1 is not recorded in the recording unit 5, i.e., the card is a unused one, the control unit 4 updates the clock in/out information (Cin/out), which has been extracted in the procedure W and corresponds to the card identification information 1*a* not yet taken over, as clock in/out information corresponding to the card identification information on the new time card and records the updated information in the recording unit 5 (step AA). The control unit gives an instruction to eject the new time card. The printing unit 3 executes this instruction (step AB). Accordingly, clock in/out information (Cin/out) is subsequently managed as illustrated in FIG. 3 relative to the card identification information 1*a* on the new time card 1.

Figure 6:
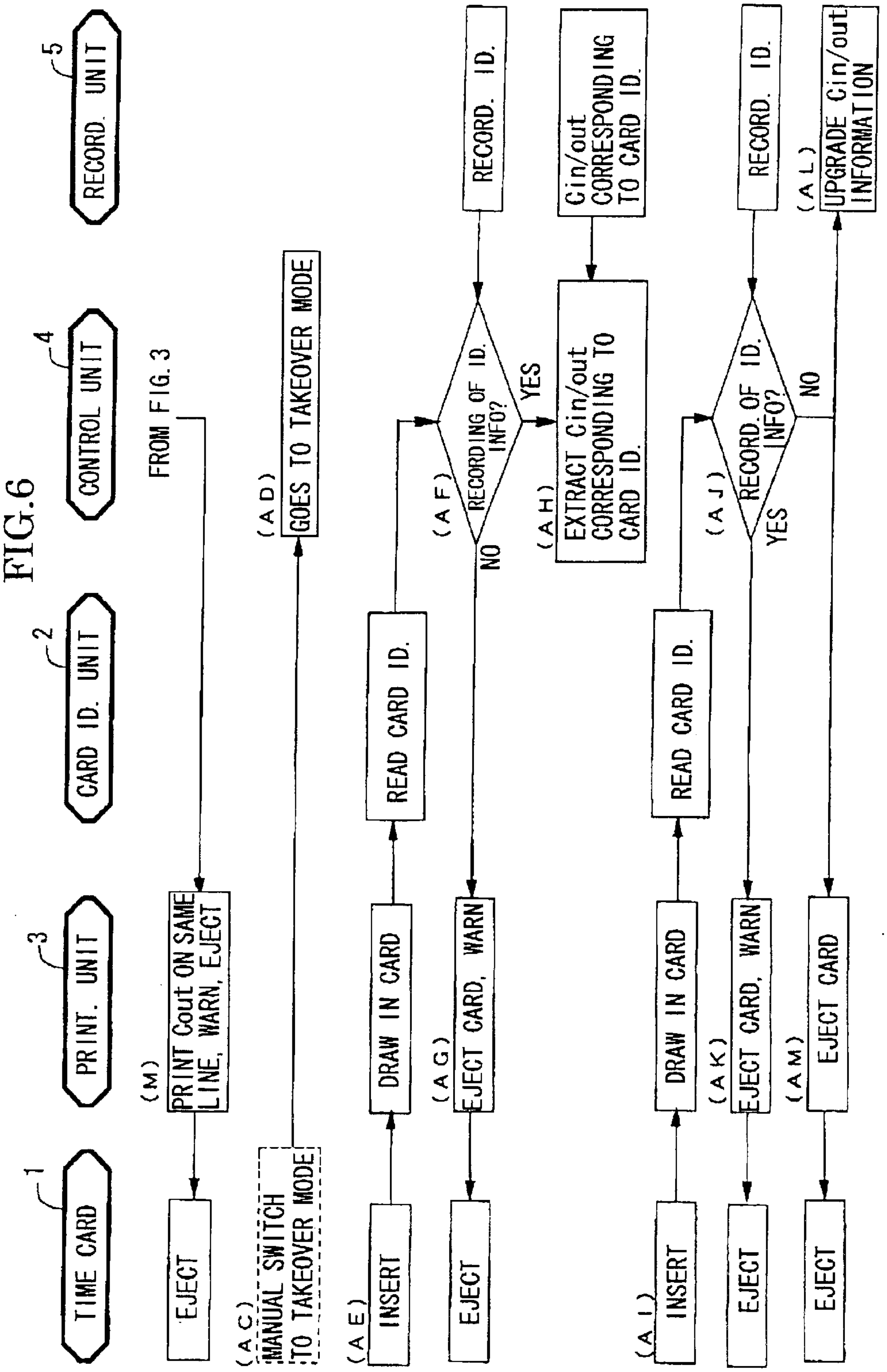
FIG. 6 is a further flowchart illustrating the flow of information processing in the takeover processing.

FIG. 6 illustrates a case where shifting to the takeover mode is done manually. That is, after the time card which is not yet taken over and on which the final printing line has been printed is ejected (step M), if the takeover mode switching switch is manually operated (step AC), the control unit 4 shifts to the takeover mode (step AD). In order that the clock in/out information (Cin/out) be taken over to the new time card 1, the clock in/out information which is not yet taken over and is to be taken over must be identified. Accordingly, in the takeover procedure illustrated in FIG. 6, the time card which is not yet taken over and on which the final line has been printed is first reinserted, thus identifying the clock in/out information to be taken over. Specifically, if a new time card 1 is inserted (step AE), the control unit 4 checks whether the card identification information 1*a* on the time card has been already recorded, in the same manner as in the foregoing procedure (step AF).

This is intended to eliminate a case where an unused time card 1 is erroneously inserted during extraction processing to be carried out in the next step. That is, where an unused time card 1 is inserted, the card identification information 1*a* is not recorded in the recording unit 5 and so the control unit 4 gives instructions to eject the time card and to issue a warning sound providing the information that there is an erroneous operation. The printing unit 3 and warning unit execute the instructions (step AG). On the other hand, if a time card 1 which is not yet handed over and on which the final line has been printed is inserted, the control unit 4 extracts clock in/out information (Cin/out), which corresponds to the card identification information 1*a* on the time card and is not yet handed over, from the recording unit 5 (step AH).

Although not illustrated, when a new time card 1 is inserted (step AI) after the time card 1 not yet handed over has been ejected, the control unit 4 checks whether the card identification information 1*a* on the time card has been already recorded in the same manner as the foregoing procedure (step AJ). This is intended to eliminate a case where a used one or a card currently used by another person is erroneously inserted as a new time card 1. In this case, the printing unit 3 ejects the erroneously inserted time card 1 and the warning unit issues a warning sound providing information to that effect under instructions of the control unit 4 (step AK).

Meanwhile, when an unused time card 1 is inserted (step AI), the control unit 4 updates the clock in/out information, which has been extracted in the step AH and is not yet handed over, as clock in/out information (Cin/out) corresponding to the card identification information 1*a* on the unused time card and records the information in the recording unit 5 (step AL). The printing unit 3 ejects the unused time card 1 under instructions of the control unit 4 (step AM). Subsequently, therefore, clock in/out information (Cin/out) is managed as illustrated in FIG. 3 relative to the card identification information 1*a* on the new time card 1.

It is also easy to construct the recorder in such a way that when clock-out information is printed, the total time obtained by summing up actual working hours is printed on the same line. Furthermore, absence, late arrival, early leave time, early arrival, overtime hours, holiday work hours, midnight work hours, and so on can be easily printed in different colors, for example, by making use of the prior art. In addition, separate handwriting or typing labor is dispensed with by printing information recorded in the recording unit on update of a new time card by means of the printing unit in the handwritten or typed columns formed at the top of the time card such as name (NAME), belonging department (DEPT), and the final day of the pay period (PAY PERIOD ENDING).

What is claimed is:

1. A time recorder adapted to be used for printing on a time card having card identification information, said time recorder comprising:

a card identification unit for identifying the card identification information;

a printing unit for printing clock in/out information on the time card;

a recording unit for recording the card identification information and the clock in/out information; and a control unit;

wherein where the time card is inserted, the control unit makes inquiries of the card identification information transmitted from the card identification unit and of the card identification information recorded in the recording unit;

wherein where the inquired identification information is recorded in the recording unit, the control unit detects immediately previously recorded clock in/out information relative to the card identification information;

wherein where the immediately previously recorded clock in/out information is clock-in information, the control unit instructs the printing unit to print clock-out information on the same print line as the clock-in information on the time card;

wherein where the immediately previously recorded clock in/out information is clock-out information, the control unit instructs the printing unit to print clock-in information on a line next to the line on which the clock-out information has been printed on the time card;

wherein where the clock-out information has been printed on a final print line of the time card, the control unit shifts to a takeover mode; and wherein where the time card is ejected and then an unused time card is inserted, the control unit updates clock in/out information, which is on the ejected time card and recorded in the recording unit, as clock in/out information relative to the card identification information on the unused time card.

2. The time recorder of claim 1, wherein said control unit updates the clock in/out information, which is on the ejected time card and recorded in the recording unit, as clock in/out information relative to the card identification information on an unused time card where the unused time card is inserted within a given time after shifting to the takeover mode.

3. The time recorder of claim 1, /wherein there is further provided a manual card identification information input unit, /and wherein where card identification information on the time card is entered by the input unit after said clock-out information is printed on the final line of the time card and the card is ejected, /the control unit extracts clock in/out information recorded relative to the card identification information from the recording unit and where an unused time card is inserted, the control unit updates the extracted clock in/out information as clock in/out information relative to the card identification information on the unused time card.

4. The time recorder of claim 1, wherein there is further provided a manual takeover mode switching unit, and wherein where (i) said clock-out information is printed on the final print line of the time card, (ii) the card is ejected, then (iii) a takeover operation is performed by the takeover mode switching unit, and (iv) the ejected time card is inserted, the control unit extracts the clock in/out information recorded relative to the card identification information on the time card from the recording unit and where an unused time card is inserted, the control unit updates the extracted clock in/out information as clock in/out information relative to the card identification information on the unused time card.

5. The time recorder of any one of claims 1 to 4, wherein there is further provided a warning unit, and wherein where said clock-out information is printed on the final print line of the time card, the control unit instructs the warning unit to operate.

6. The time recorder of claim 5, wherein where the time card having card identification information already recorded in the recording unit is inserted instead of said unused time card, the control unit instructs the warning unit to operate without updating the clock in/out information.

7. A time recorder adapted to be used for printing on a time card having card identification information, said time recorder comprising:

a card identification unit for identifying the card identification information;

a printing unit for printing clock in/out information on the time card;

a recording unit for recording the card identification information and the clock in/out information; and a control unit;

wherein where the time card is inserted, the control unit makes inquiries of the card identification information transmitted from the card identification unit and of the card identification information recorded in the recording unit;

wherein where the inquired card identification information is recorded in the recording unit, the control unit detects immediately previously recorded clock in/out information relative to the card identification information;

wherein where the immediately previously recorded clock in/out information is clock-in information, the control unit instructs the printing unit to print clock-out information on the same print line as the clock-in information on the time card;

wherein where the immediately previously recorded clock in/out information is clock-out information, the control unit instructs the printing unit to print clock-in information on a line next to the print line on which the clock-out information has been printed on the time card;

wherein where the time card on which the clock-out information has been printed on its final print line is inserted, the control unit shifts to a takeover mode; and wherein where the time card is ejected and then an unused time card is inserted, the control unit updates clock in/out information, which is on the ejected time card and recorded in the recording unit, as clock in/out information relative to the card identification information on the unused time card.

* * * * *